United States Patent
Kim et al.

(10) Patent No.: US 11,508,963 B2
(45) Date of Patent: Nov. 22, 2022

(54) LITHIUM SECONDARY BATTERY AND THICK FILM ELECTRODE FOR THE SAME

(71) Applicant: GWANGJU INSTITUTE OF SCIENCE AND TECHNOLOGY, Gwangju (KR)

(72) Inventors: Hyeong-Jin Kim, Gwangju (KR); Chan-Young Jeon, Gwangju (KR); Jun-Su Park, Gwangju (KR); Sung-Ho Jeong, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 286 days.

(21) Appl. No.: 16/833,433

(22) Filed: Mar. 27, 2020

(65) Prior Publication Data
US 2020/0313181 A1    Oct. 1, 2020

(51) Int. Cl.
| H01M 4/525 | (2010.01) |
| H01M 4/04 | (2006.01) |
| H01M 4/88 | (2006.01) |
| H01M 10/0525 | (2010.01) |
| H01M 10/0568 | (2010.01) |
| H01M 10/0569 | (2010.01) |

(52) U.S. Cl.
CPC ......... *H01M 4/525* (2013.01); *H01M 4/0404* (2013.01); *H01M 4/8875* (2013.01); *H01M 10/0525* (2013.01); *H01M 10/0568* (2013.01); *H01M 10/0569* (2013.01)

(58) Field of Classification Search
CPC ......... H01M 10/0525; H01M 10/0568; H01M 10/0569; H01M 2004/021; H01M 2004/027; H01M 2004/028; H01M 4/0404; H01M 4/13; H01M 4/131; H01M 4/139; H01M 4/1391; H01M 4/1393; H01M 4/525; H01M 4/587; H01M 4/8875; Y02E 60/10; Y02E 60/50
See application file for complete search history.

(56) References Cited

U.S. PATENT DOCUMENTS

2017/0256777 A1* 9/2017 Akikusa .................. H01M 4/13

FOREIGN PATENT DOCUMENTS

| JP | 2010086717 A | 4/2010 |
| KR | 1020150082958 A | 7/2015 |
| KR | 1020160116969 A | 10/2016 |

(Continued)

OTHER PUBLICATIONS

Poster Presentation. 19th Int'l Meeting on Lithium Batteries. IMLB2018, Kyoto International Conf. Center, Kyoto, Japan (Jun. 17-22, 2018).

(Continued)

*Primary Examiner* — Victoria H Lynch
(74) *Attorney, Agent, or Firm* — Loza & Loza, LLP; Heidi L. Eisenhut

(57) ABSTRACT

A thick film electrode for a lithium secondary battery is provided. The lithium secondary battery includes a thick film electrode including a cathode including a cathode active material and an anode including an anode active material. The cathode and the anode have a thickness in a range of 250 μm to 1500 μm, and are laser-etched such that one or more grooves are formed in the cathode and the anode.

20 Claims, 9 Drawing Sheets

(56) References Cited

FOREIGN PATENT DOCUMENTS

KR   1020160143109 A   12/2016
KR   1020180023822 A   3/2018

OTHER PUBLICATIONS

Park et al. "Performance enhancement of Li-ion battery by laser structuring of thick electrode with low porosity." J. Ind. & Engr. Chem. 70, 178-185 (2019).
Jeon et al. "The effect of the laser structuring on the thick electrode for high energy density lithium-ion batteries." Gwangju Inst. of Science and Technology, Energy Storage Material and Device Laboratory, Institute of Integrated Technology (2018).

* cited by examiner

FIG. 2
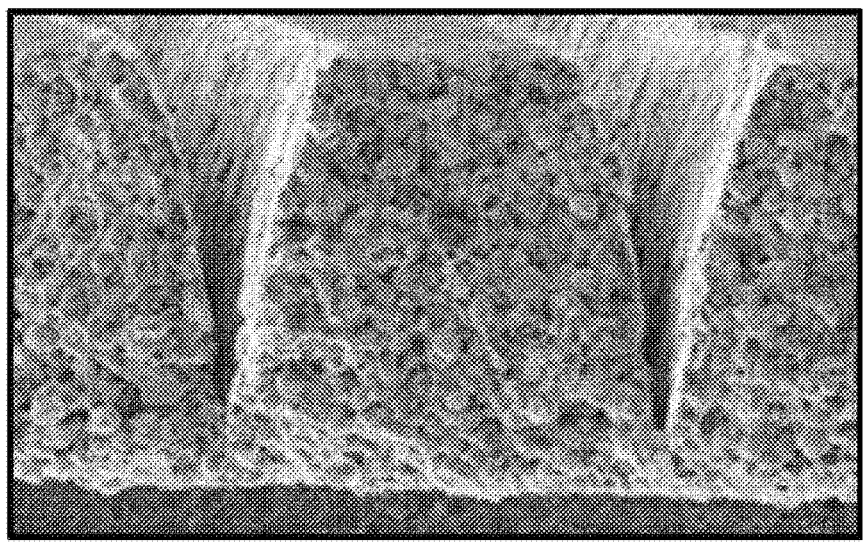
(a)
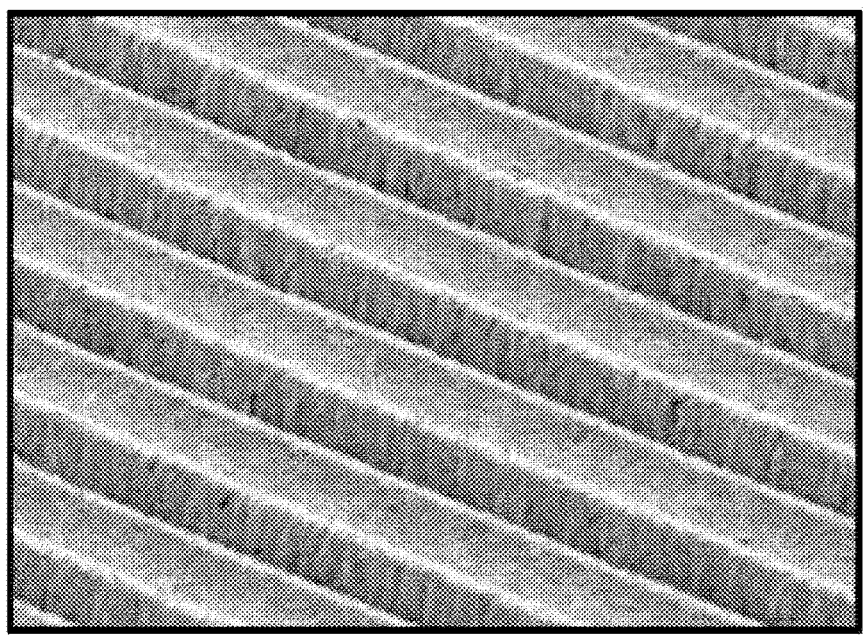
(b)

(L0)

(L1)

(L2)

(L3)

(L4)

(L5)

FIG. 7
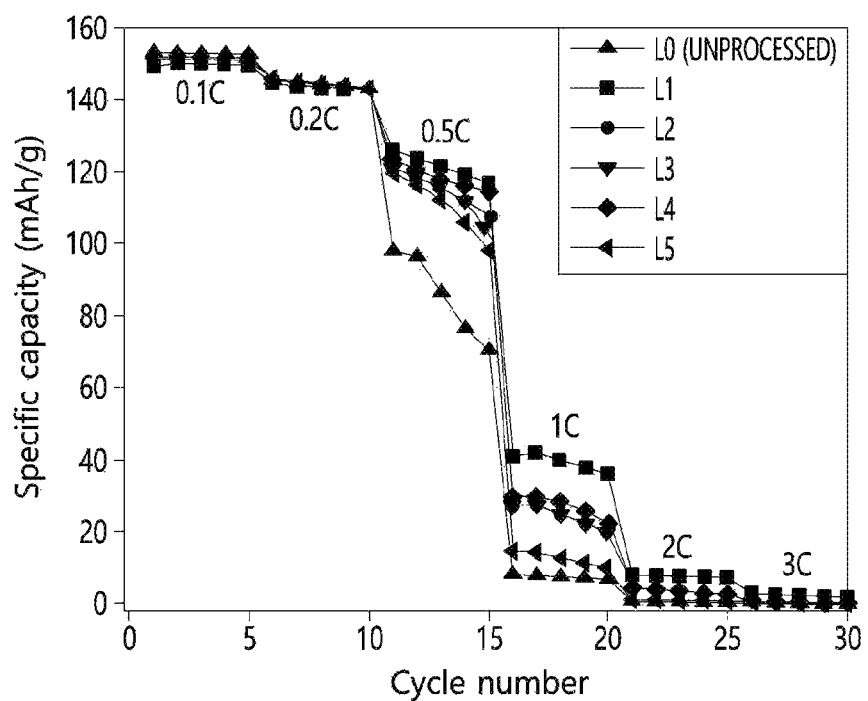
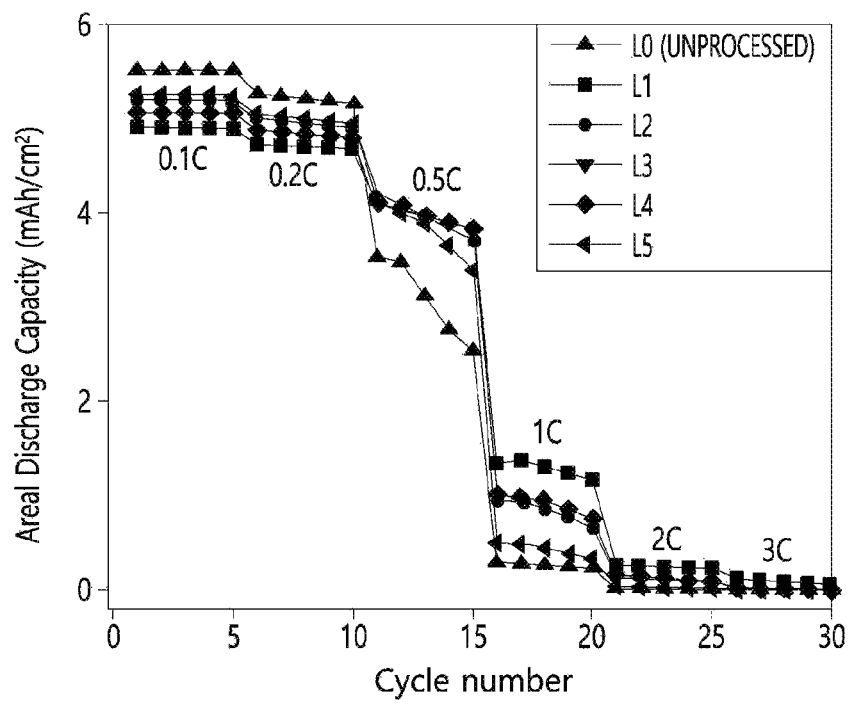

LITHIUM SECONDARY BATTERY AND THICK FILM ELECTRODE FOR THE SAME

CROSS-REFERENCE TO RELATED APPLICATIONS

This application claims priority to Korean Patent Application No. 10-2019-0035426 filed on Mar. 27, 2019 in Korea, the entire contents of which is hereby incorporated by reference in its entirety.

BACKGROUND

The present disclosure relates to a lithium secondary battery and a thick film electrode for the same, capable of realizing a higher-energy density and high performance as the surface of a thick electrode is etched and structuralized.

Recently, the demand and interest in a battery for a higher-energy device have been rapidly increased, and research and studies have been developed on components of the battery and a design of the battery to realize the desired performance.

Manufacturing an electrode to have a thick thickness, that is, manufacturing the electrode in the form of a thick film is a manner to hold components of the battery while effectively increasing an energy density.

However, when the thickness of the electrode becomes thick, the moving path of a lithium ion in the electrode is extended or blocked. Accordingly, Problems such as a decrease in ion conductivity in an electrode and an increase in electrical resistance occur. Such a phenomenon causes the reduction in a charge capacity or discharge capacity of the battery and a lower output characteristic. Accordingly, commercializing the thick film electrode may be difficult.

Therefore, there is needed a manner to resolve the higher electrical resistance of the thick film electrode and to enhance the conductivity of the lithium ion.

SUMMARY

The present disclosure is to provide a lithium secondary battery and a thick film electrode for the lithium secondary battery, capable of realizing a higher-energy density and high performance as the surface of a thick electrode is etched and structuralized.

According to an embodiment, a thick film electrode of a lithium secondary battery includes a cathode including a cathode active material and an anode including an anode active material. The cathode and the anode have a thickness in a range of 250 μm to 1500 μm, and are laser-etched to form one or more grooves on a surface.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 2 illustrates a thick film electrode having a structuralized surface;

FIG. 7 illustrates graphs showing an electrode capacity per unit mass and an electrode capacity per unit area obtained through the experiment for a plurality of electrode samples at various discharge current rates.

DETAILED DESCRIPTION OF THE EMBODIMENTS

Figure 1:
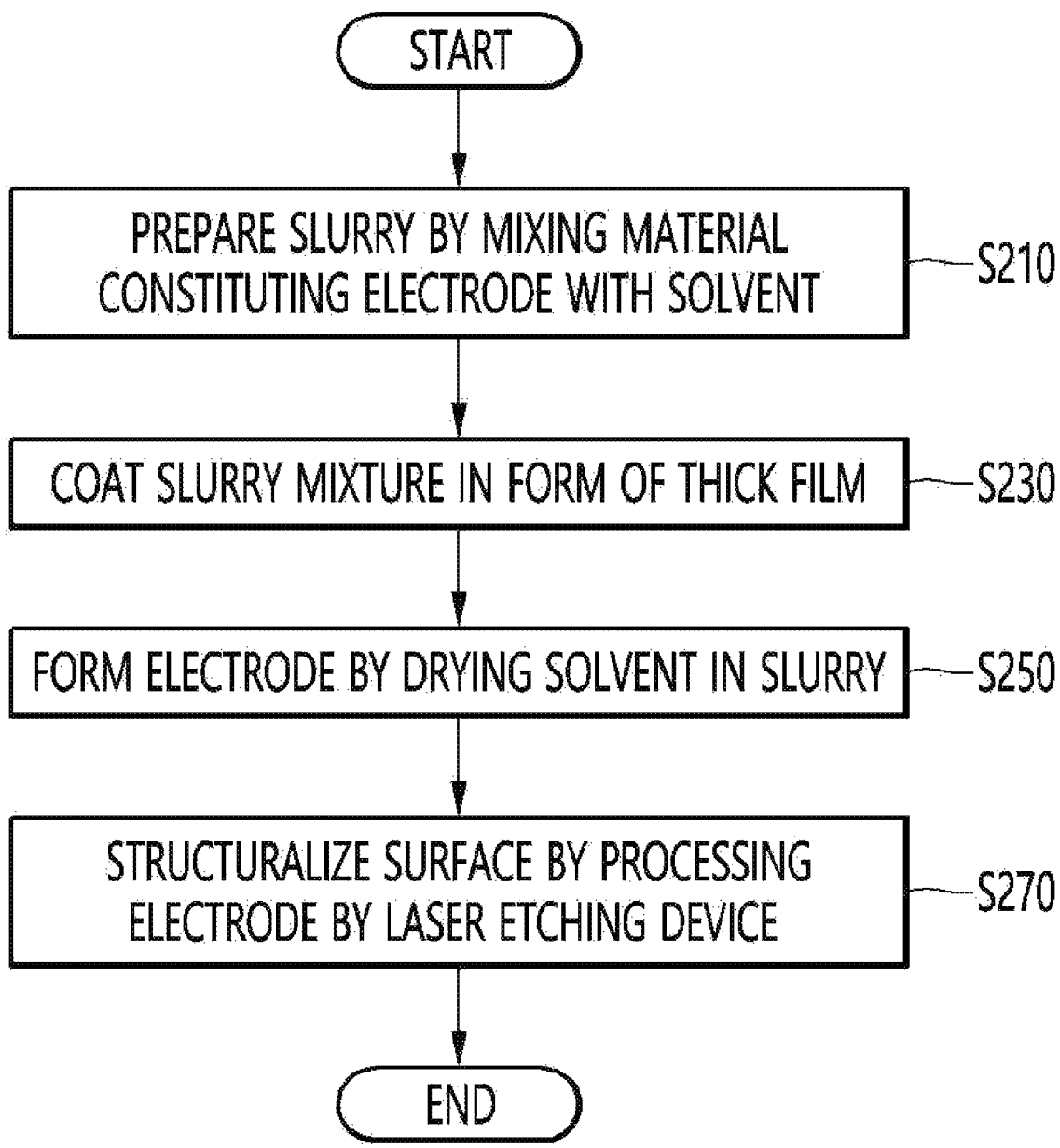
FIG. 1 is a flowchart illustrating a method for manufacturing a thick film electrode according to an embodiment of the present disclosure.

Hereinafter, the embodiment disclosed in the present disclosure will be described with reference to accompanying drawings. Same or similar components will be assigned with the same reference numerals, and the duplicated description thereof will be omitted. Suffixes of components, such as "module" and "unit", which are employed in the following description, are merely intend to facilitate description of the specification, and the suffix itself is not intend to give any special meaning or function. In addition, in the following description of an embodiment disclosed in the present disclosure, a detailed description of well-known art or functions will be ruled out in order not to unnecessarily obscure the gist of embodiments disclosed in the present disclosure. In addition, the accompanying drawings are provided for the convenience of explanation of an embodiment disclosed in the present disclosure, and the technical spirit disclosed in the present specification is not limited. All modifications, equivalents, or substitutes are interpreted as being included in the technical spirit and the technical scope of the present disclosure.

Although the terms of an ordinal number such as "first", "second", etc. may be used herein to describe various components, these components should not be limited by these terms. These terms are used to distinguish one component from another component.

It will be understood that when a component is referred to as being coupled with/to or "connected to" another component, the component may be directly coupled with/to or connected to the another component or an intervening component may be present therebetween. Meanwhile, it will be understood that when a component is referred to as being directly coupled with/to" or "connected to" another component, an intervening component may be absent therebetween.

The singular forms are intended to include the plural forms unless the context clearly indicates otherwise. In the present application, it will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

FIG. 1 is a flowchart illustrating a method for manufacturing a thick film electrode according to an embodiment of the present disclosure.

Referring to FIG. 1, according to an embodiment of the present disclosure, the method for manufacturing the thick film electrode includes forming slurry by mixing an electrode active material constituting an electrode, a conductive material, and a binder material with a solvent (S210), coating a slurry mixture in the form of a thick film on a conductive substrate to form a cathode layer or an anode layer (S230), compressing the electrode to obtain a specific porosity after forming the electrode by drying the solvent in the slurry (S250), and structuralizing the electrode surface by processing the formed electrode through a laser etching device (S270).

Regarding the further detailed description of structuralizing the electrode surface, the thick film electrode may be positioned at the laser etching device and a laser beam having a specific wavelength and a specific frequency may be irradiated into the thick film electrode. Accordingly, a groove having a specific shape may be formed in the electrode surface.

FIG. 2 illustrates a thick film electrode having a structuralized surface. FIG. 2A is a cross-sectional view of the thick film electrode, and FIG. 2B is a front view of the thick film electrode.

Meanwhile, a lithium secondary battery may be formed by forming a positive electrode and a negative electrode, which are laser-processed, as a cathode and an anode of the lithium secondary battery, respectively, and by including a separator and an electrolyte.

In addition, the lithium secondary battery may be formed by laser-processing one of the positive electrode and the negative electrode and forming the laser-processed electrode and a counter electrode as the cathode and the anode of the lithium secondary battery, respectively, and by including the separator and the electrolyte.

Figure 3:
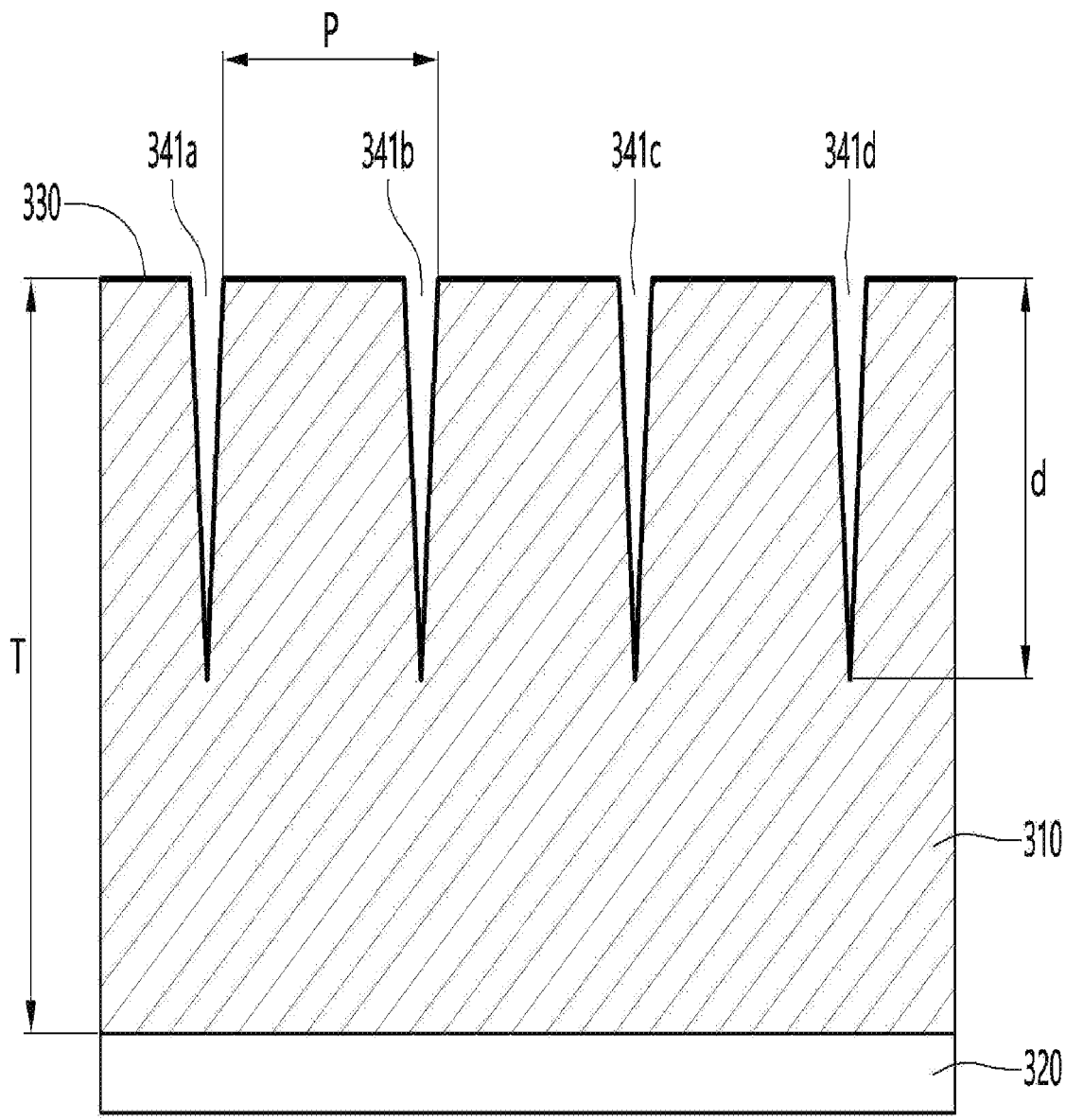
FIG. 3 is a view illustrating a thickness of an electrode, a depth of a groove, and a distance between grooves, according to an embodiment of the present disclosure.

FIG. 3 is a view illustrating a thickness (electrode thickness) of an electrode, a depth of a groove, and a distance between grooves, according to an embodiment of the present disclosure.

The thickness T of a thick film electrode 310 described according to the present disclosure may be in the range of 250 μm or more and 1500 μm or less.

In other words, the thick film electrode 310 may include a cathode including a cathode active material and an anode including an anode active material. The cathode and the anode may have the thicknesses in the range of 250 μm or more and 1500 μm or less.

In this case, the cathode active material may include at least one of lithium transition metal oxide, lithium-sulfur, lithium-selenium, lithium-selenium sulfur, or transition metal oxide.

In addition, the anode active material may include at least one of carbon-based anode oxide, silicon, silicon oxide, tin, transition metal oxide, or lithium metal.

The thick film electrode 310 may be provided in a single film form on a conductive current collector 320.

Meanwhile, the surface of the thick film electrode 310 may be processed and structuralized.

In detail, the surface of the thick film electrode 310 is laser-etched, so one or more grooves 341a, 341b, 341c, and 341d may be formed in the surface 310.

Meanwhile, laser pulses (femtosecond, picosecond, nanosecond) having various wavelengths may be used for laser-etching.

In this case, the femtosecond laser is a laser having a significantly short pulse width for $10^{-15}$ seconds. In addition, when the electrode is processed using the femtosecond laser, the electrode material may be processed without thermal denaturalization. In addition, a smaller amount of impact is applied to a processing material, so the electrode may be accurately processed in micro-size with higher quality.

Meanwhile, one or more grooves 341a, 341b, 341c, and 341d may be formed in various shapes. In detail, one or more grooves 341a, 341b, 341c, and 341d may have the shape of a straight line, a grid, or a point.

Meanwhile, the depth d of one or more grooves 341a, 341b, 341c, and 341d may be in the range of 1% or more or 100% or less of the thickness T of the thick film electrode 310.

In detail, the depth of one or more grooves formed in the cathode may be in the range of 1% or more or 100% or less of the thickness of the cathode. The depth of one or more grooves formed in the anode may be in the range of 1% or more or 100% or less of the thickness of the anode.

Meanwhile, the thick film electrode is laser-etched, so a plurality of grooves may be formed at constant interval P in the surface of the thick film electrode. In this case, the constant distances may be in the range of 10 μm or more and 1000 μm or less.

Meanwhile, a surficial area 330 of the thick film electrode may be changed depending on the depth (groove depth) of the groove formed in the thick film electrode and the distance (groove distance) between the grooves. In detail, as the depth of the groove formed in the thick film electrode is increased, and the interval between the grooves is decreased, the surficial area 330 of the thick film electrode may be increased.

The following table shows surficial areas 330 calculated using various samples L0 to L5.

TABLE 1

| Electrode sample | L0 | L1 | L2 | L3 | L4 | L5 |
|---|---|---|---|---|---|---|
| Distance (μm) | 0 (unprocessed) | 200 | 400 | 600 | 200 | 200 |
| Thickness (%) | 0 (unprocessed) | 100 | 100 | 100 | 66.7 | 33.3 |
| Surficial area of electrode (μm²) | 638822 | 996612 | 840131 | 748691 | 861200 | 782173 |
| Surficial area ratio (Lx/Lo) | 1 | 1.56 | 1.32 | 1.17 | 1.35 | 1.22 |

In this case, the increment of the surficial area may be expressed through the following equation.

$$\text{Surficial area increase ratio} = \frac{k \times \text{Depth (\%)}}{\text{pitch (μm)}}, \qquad \text{Equation 1}$$

(k: Proportional constant (k=120 μm), Depth: processing depth, Pitch: processing interval)

According to Equation 1, the surficial area increase ratio of sample 1 (L1) is 60%, the surficial area increase ratio of sample 2 (L2) is 30%, the surficial area increase ratio of sample 3 (L3) is 20%, the surficial area increase ratio of sample 4 (L4) is 40%, and the surficial area increase ratio of sample 5 (L5) is 20%.

Meanwhile, a surficial area ratio (Lx/Lo) may refer to a ratio of a surficial area (Lx) of a processed electrode (an electrode having a groove) to a surficial area (Lo) of an unprocessed electrode (an electrode having no groove) when the processed electrode and the unprocessed electrode have the same ingredient.

Figure 4:
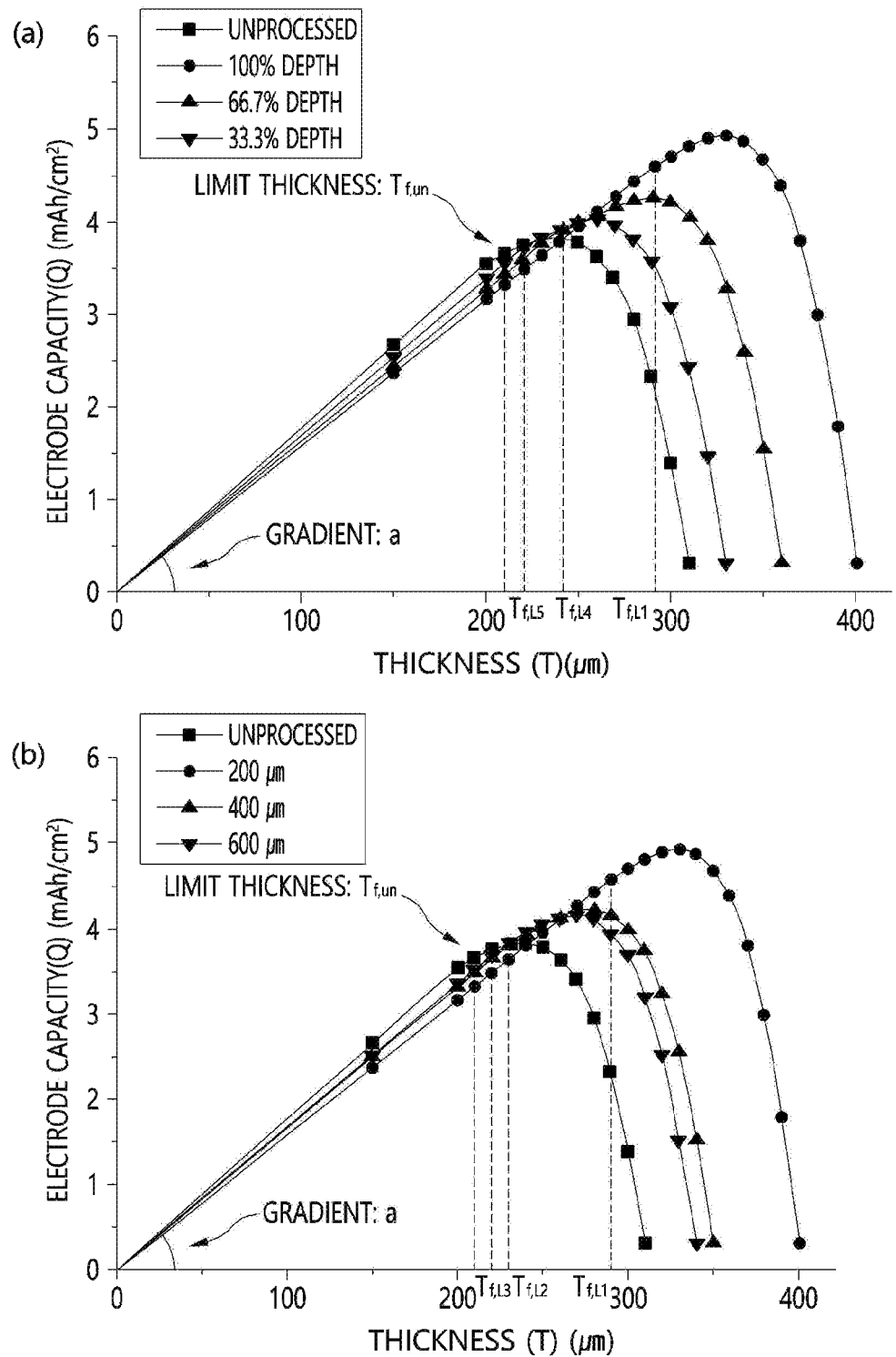
FIG. 4 is a view illustrating the relationship between the thickness of an electrode and an electrode capacity, as the surficial area of the electrode is structuralized.

FIG. 4 is a view illustrating the relationship between an electrode thickness and an electrode capacity, as the surficial area of the electrode is structuralized.

The experiment of FIG. 4 is performed at a discharge current rate (C-rate) of 0.5 C.

A limit thickness $T_f$ may refer to a thickness at which an electrode capacity (mAh/g) per unit mass starts to be deteriorated.

In detail, an electrode capacity (mAh/cm$^2$) per unit area may be linearly increased before the limit thickness. This may be expressed as the following equation.

Equation 2

$$Q = a \cdot T \ (T < Tf)$$

(Q: electrode capacity (mAh/cm$^2$), T: electrode thickness (μm), a: graph gradient, $T_f$: limit thickness)

As the electrode capacity (mAh/cm$^2$) per unit area is linearly increased before the limit thickness, the increase ratio of the electrode capacity (mAh/cm$^2$) per unit area before the limit thickness may be higher than the increate ratio of the electrode capacity (mAh/cm$^2$) per unit area after the limit thickness.

Meanwhile, the limit thickness ($T_{f,un}$) of the unprocessed electrode having the same ingredient as that of the processed electrode was experimentally measured to be 210 μm, and the gradient ($a_{un}$) of the unprocessed electrode (L0) was measured to be 0.0178.

Meanwhile, the limit thickness of the processed thick film electrode may be calculated as a product of the square of the surficial area ratio of the processed thick film electrode and the limit thickness of the unprocessed electrode (L0). This may be expressed as the following equation.

Equation 3

$$T_f = T_{f,un} \times (\text{surficial area})^2$$

($T_f$: limit thickness, $T_{f,un}$: limit thickness of unprocessed electrode).

Meanwhile, the electrode mass ratio may refer to a ratio of a mass of the processed electrode (electrode having a groove) Lx to a mass of a processed electrode (electrode having no groove) Lo having the same ingredient.

In addition, the gradient (that is, the ratio of the increment of the electrode capacity to the increment of the thickness) of the electrode capacity (mAh/cm$^2$) of the processed thick film electrode may be calculated as the product of the mass ratio of the processed thick film electrode and the gradient of the electrode capacity (mAh/cm$^2$) of the unprocessed electrode (L0). This may be expressed through the following equation.

Equation 4

$$a = a_{un} \cdot \text{electrode mass ratio}$$

(a: The ratio (gradient) of the increment of the electrode capacity to the increment in the thickness of the processed thick film electrode, and $a_{un}$: the ratio (gradient) of the increment of the electrode capacity to the increment in the thickness of the unprocessed electrode.)

Referring to Equations 2 to 4, and FIG. 4A, it may be understood that the limit thicknesses ($T_{f,L1}$, $T_{f,L4}$, and $T_{f,L5}$) of electrodes processed to have various thicknesses are greater than the limit thickness ($T_{f,un}$) of the unprocessed electrode.

Referring to Equations 2 to 4, and FIG. 4B, it may be understood that the limit thicknesses ($T_{f,L1}$, $T_{f,L2}$, and $T_{f,L3}$) of electrodes processed to have various intervals(distances between grooves) are greater than the limit thickness ($T_{f,un}$) of the unprocessed electrode.

When the electrode surface is structuralized, the loss of the electrode mass is caused, so the ratio (gradient) of the increment of the electrode capacity to the increment in the thickness of the thick film electrode may be reduced.

When the electrode surface is structuralized, the surficial area of the electrode is increased, and the transfer path of the lithium ion is reduced to reduce the electrical resistance and to improve the conductivity of the lithium ion.

As the electrode surface is structuralized, even though the loss of the electrode mass is caused, the limit thickness may be increased.

In detail, the limit thickness of the electrode is 210 μm in the unprocessed state of the electrode, and when the electrode thickness becomes greater than 210 μm, the electrode capacity is reduced, that is, the electrode capacity (mAh/g) per unit mass is reduced. Accordingly, the performance of the electrode may be degraded.

However, according to the present disclosure, since the limit thickness is increased due to the electrode surface which is structuralized, the electrode performance is not deteriorated even if the electrode thickness is greater than 210 μm.

Hereinafter, the relationship between the electrode thickness after the limit thickness and the electrode capacity will be described.

As an electrode thickness before the limit thickness is increased, an electrode capacity (mAh/cm$^2$) per unit area is linearly increased. To the contrary, as the electrode thickness after the limit thickness is increased, the graph of the electrode capacity (mAh/cm$^2$) per unit area may represent the form of a secondary equation. This may be expressed as the following equation.

Equation 5

$$Q = A + B \cdot T + C \cdot T^2$$

(Q: electrode capacity (mAh/cm$^2$), T: electrode thickness (μm), and A, B, C: constants)

Meanwhile, as illustrated in FIG. 4A, constants (A, B, and C) when an electrode is processed to have grooves formed with various depths, constants A, B, and C were calculated as shown in following table 2.

TABLE 2

| | L0 (unprocessed) | L1 | L4 | L5 |
|---|---|---|---|---|
| A | −39.6872 | −74.9647 | −48.7563 | −42.3227 |
| B | 0.36073 | 0.49425 | 0.37443 | 0.36021 |
| C | −7.46E−04 | −7.63E−04 | −6.59E−04 | −6.98E−04 |

In addition, as illustrated in FIG. 4B, when an electrode is processed to have grooves formed with various distances therebetween, the constants A, B, and C were calculated as shown in table 3.

TABLE 3

|   | L0 (unprocessed) | L1 | L2 | L3 |
|---|---|---|---|---|
| A | −39.6872 | −74.9647 | −44.5222 | −40.4413 |
| B | 0.36073 | 0.49425 | 0.35679 | 0.33893 |
| C | −7.46E−04 | −7.63E−04 | −6.51E−04 | −6.42E−04 |

After the limit thickness, the electrode capacity (mAh/cm$^2$) per unit area is increased and then decreased in the form of a secondary equation. Therefore, the increase ratio of the electrode capacity (mAh/cm$^2$) per unit area after the limit thickness may be lower than the increase ratio of the electrode capacity (mAh/cm$^2$) per unit area before the limit thickness.

Meanwhile, the increase ratio of the electrode capacity (mAh/cm$^2$) per unit area after the limit thickness may be reduced as the thickness of the electrode is increased.

However, as the electrode thickness is increased, the electrode capacity (mAh/cm$^2$) per unit area after the limit thickness is increased and then is decreased at a specific thickness.

For example, referring to FIG. 4A, the electrode capacity (mAh/cm$^2$) per unit area of sample L1 (which is processed at the depth of 100% of the electrode thickness) may represent the maximum value at the thickness of around 330 μm, the electrode capacity (mAh/cm$^2$) per unit area of sample L4 (which is processed at the depth of 66.7% of the electrode thickness) may represent the maximum value at the thickness of around 295 μm, and the electrode capacity (mAh/cm$^2$) per unit area of sample L5 (which is processed at the depth of 33.3% of the electrode thickness) may represent the maximum value at the thickness of around 270 μm.

In addition, the electrode capacity (mAh/cm$^2$) per unit area of an unprocessed sample may represent the maximum value at the thickness of around 240 μm.

In other words, referring to Equation 5 and FIG. 4A, it may be recognized that the maximum value of the electrode capacity (mAh/cm$^2$) per unit area of electrodes processed to have grooves formed with various depths are greater than a maximum electrode capacity per unit area of the unprocessed electrode. In addition, the electrode thickness indicating the maximum electrode capacity of the electrodes processed to have grooves formed with various depths may be greater than the electrode thickness indicating the maximum electrode capacity of the unprocessed electrode.

For another example, referring to FIG. 4B, the electrode capacity (mAh/cm$^2$) per unit area of the sample L1 (which is processed at the groove distance of 200 μm) may represent the maximum value at the thickness of around 330 μm, the electrode capacity (mAh/cm$^2$) per unit area of the sample L2 (which is processed at the groove distance of 400 μm) may represent the maximum value at the thickness of around 280 μm, and the electrode capacity (mAh/cm$^2$) per unit area of the sample L3 (which is processed at the groove distance of 600 μm) may represent the maximum value at the thickness of around 270 μm.

In addition, the electrode capacity (mAh/cm$^2$) per unit area of an unprocessed sample may represent the maximum value at the thickness of around 240 μm.

In other words, referring to Equations 5 and 4B, it may be recognized that maximum value of the electrode capacities (mAh/cm$^2$) per unit area of electrodes processed to have grooves formed with various distances therebetween may be greater than the maximum value of an electrode capacity per unit area of the unprocessed electrode. In addition, the electrode thickness representing the maximum value in the electrode capacities of the electrodes processed to have grooves formed with various distances therebetween may be greater than the electrode thickness representing the maximum value in the electrode capacity of the unprocessed electrode.

In conclusion, when the electrode surface is not structuralized, the maximum performance may be represented at the electrode thickness of around 240 μm, and the performance is more rapidly deteriorated as the electrode thickness is more increased. In other words, when the electrode surface is not structuralized, the electrode thickness is increased to 240 μm, and the electrode thickness representing the electrode capacity of 3.7 mAh/cm$^2$ is the maximum electrode thickness.

However, according to the present disclosure, as the electrode surface is structuralized, for example, as the depth of the groove is processed to be in the range of 1% to 100% of the electrode thickness, or as the distance between grooves is processed to be in the range of 10 μm to 1000 μm, higher performance may be represented even though the electrode thickness is more increased. For example, in the case of sample L4, the electrode thickness may be increased to 295 μm, so the electrode capacity of 4.2 mAh/cm$^2$ may be represented.

Meanwhile, referring to FIG. 4A, when the depths of one or more grooves formed in the thick film electrode are 100% of the thickness of the thick film electrode, the highest electrode capacity (mAh/cm$^2$) may be represented.

For example, when the depth of one or more grooves formed in the cathode is 100% of the thickness of the cathode and the depths of one or more depths formed in the anode is 100% of the thickness of the anode, the highest electrode capacity (mAh/cm$^2$) may be represented.

In addition, referring to FIG. 4B, when the distance between grooves formed in the thick film electrode is in the range of 10 μm to 200 μm, the highest electrode capacity (mAh/cm$^2$) may be represented.

Figure 5:
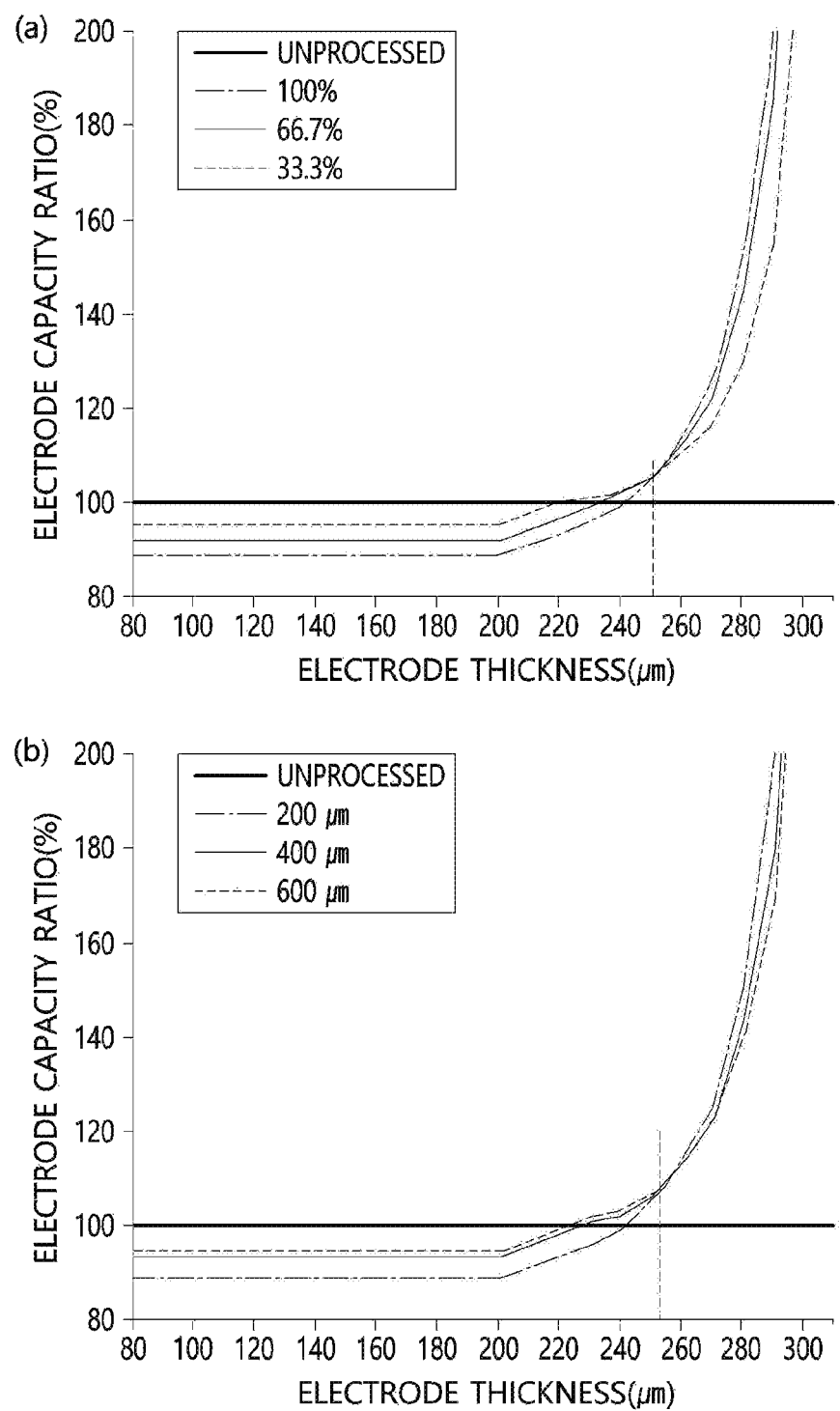
FIG. 5A is a graph illustrating an electrode capacity ratio as a function of the thickness of a groove, when an electrode capacity of an unprocessed electrode is converted based on 100%.
FIG. 5B is a graph illustrating an electrode capacity between processed electrodes as a function of the distance between grooves, when an electrode capacity of an unprocessed electrode is converted based on 100%.

FIG. 5A is a graph illustrating an electrode capacity ratio as a function of the thickness of a groove, when an electrode capacity (mAh/cm$^2$) of an unprocessed electrode is converted based on 100%. The experiment is performed at a discharge current rate (C-rate) of 0.5 C.

Referring to FIG. 5A, it may be understood that the electrode capacity ratio of progressed electrodes was rapidly increased at the electrode thickness in the range of 240 μm to 250 μm.

In other words, in the case of the unprocessed electrode, as described with reference to FIG. 4, after the electrode capacity represents the maximum value at the electrode thickness of around 240 μm, the electrode capacity is rapidly reduced as the electrode thickness is increased.

However, in the case of the electrode processed at various thicknesses, even if the electrode thickness is increased to be 250 μm or more, the electrode capacity is increased. Accordingly, the electrode capacity ratio of the processed electrodes may be rapidly increased at the electrode thickness of around 250 μm.

Meanwhile, referring to FIG. 5A, as the depth of one or more grooves formed in the thick film electrode are increased, the processed thick film electrode may represent the higher electrode capacity ratio.

As the depth of one or more grooves formed in the thick film electrode is increased, the electrode capacity (mAh/cm$^2$) of the thick film electrode is increased. When the depth of one or more groove formed in the thick film electrode is 100% of the thickness of the thick film electrode, the processed thick film electrode may represent the highest electrode capacity.

FIG. 5B is a graph illustrating an electrode capacity between processed electrodes as a function of the distance between grooves, when an electrode capacity (mAh/cm$^2$) of an unprocessed electrode is converted based on 100%. The experiment is performed at a discharge current rate (C-rate) of 0.5 C.

Referring to FIG. 5b, it may be understood that the electrode capacity ratio of progressed electrodes was rapidly increased at the electrode thickness of 240 µm to 250 µm.

In other words, in the case of the unprocessed electrode, as described with reference to FIG. 4, after the electrode capacity represents the maximum value at the electrode thickness of around 240 µm, the electrode capacity is rapidly decreased as the electrode thickness is increased.

However, even if the electrode thickness of the electrode processed to have grooves formed with various distances therebetween is increased to be 250 µm or more, the electrode capacity is increased. Accordingly, the electrode capacity ratio of the processed electrodes may be rapidly increased at the electrode thickness of around 250 µm.

Meanwhile, referring to FIG. 5B, as the distance between grooves formed in the thick film electrode is decreased, the processed thick film electrode may represent the higher electrode capacity ratio.

In other words, as the distance between grooves formed in the thick film electrode is reduced, the electrode capacity (mAh/cm$^2$) of the thick film electrode is increased. When the distance between the grooves formed in the thick film electrode is shorter than 200 µm, the processed thick film electrode may represent the higher electrode capacity.

Figure 6:
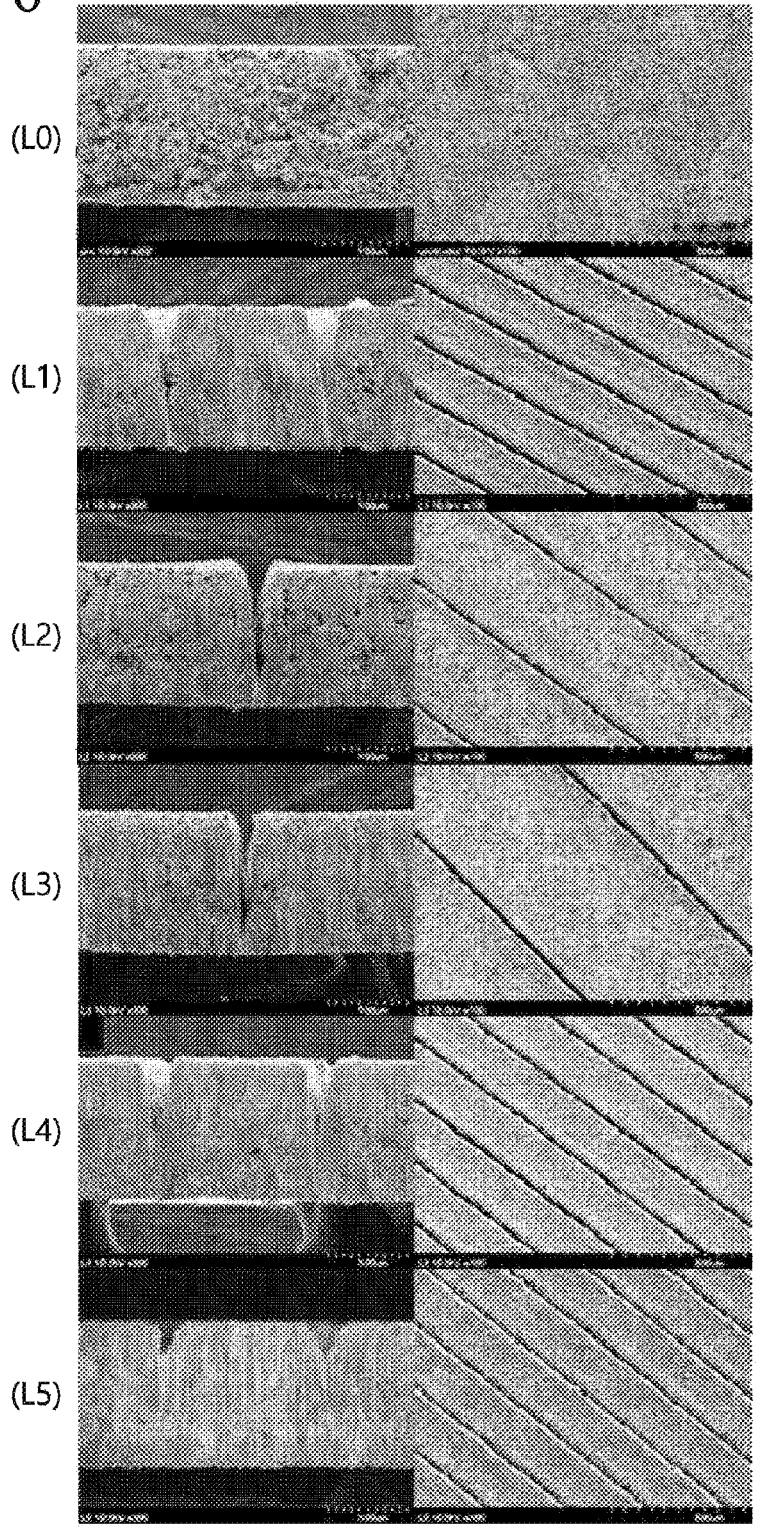
FIG. 6 illustrates sectional views and front views of various electrode samples described with reference to table 1.

FIG. 6 illustrates sectional views and front views of various electrode samples (L0 to L5) described with reference to table 1.

FIG. 7 illustrates graphs of an electrode capacity (mAh/cm$^2$) per unit mass and an electrode capacity (mAh/cm$^2$) per unit area obtained as the experiments for a plurality of electrode samples (L0 to L5) are performed at various discharge current rates.

The experiment was performed with respect to an electrode (NMC half-cell) employing nickel manganese cobalt with a thickness of 250 µm.

According to an embodiment of the present disclosure, the thick film electrode may be used for the lithium secondary battery having the discharge current rate (C-rate) in the range of 0.1 C or more and 1.0 C or less.

In particular, according to an embodiment of the present disclosure, the thick film electrode may be used for the lithium secondary battery having the discharge current rate (C-rate) in the range of 0.5 C or more and 1.0 C or less.

Meanwhile, the result obtained by comparing the sample L0 having an unprocessed surface with the sample L1 is shown through the following table.

TABLE 4

| | Cell capacity (mAh/g) | | Capacity improvement |
|---|---|---|---|
| | L0 (unprocessed) | L1 | ratio (%) |
| 0.1 C | 150 | 150 | — |
| 0.2 C | 144 | 144 | — |
| 0.5 C | 85 | 120 | 40 |
| 1 C | 8 | 40 | 400 |

Referring to table 4, and FIG. 7A, it may be recognized that the electrode capacity (mAh/g) per unit mass of the processed thick film electrode represents a significant difference from the electrode capacity (mAh/g) per unit mass of the unprocessed thick film electrode, at the discharge current rate in the range of 0.5 C and 1 C.

Referring to FIG. 7B, it may be recognized that the electrode capacity (mAh/cm$^2$) per unit area of the processed thick film electrode represents a significant difference from the electrode capacity (mAh/cm$^2$) per unit area of the unprocessed thick film electrode, at the discharge current rate of 0.5 C and 1 C.

Meanwhile, referring to table 1 and FIG. 7A, when comparing samples L1, L4, and L5 having grooves having the same distances with each other in the case of the discharge current rate (C-rate) is 0.5 C, the highest electrode capacity per unit mass at a groove depth corresponding to 100% of the electrode thickness (sample L1). Accordingly, the optimal groove depth may be 100% of the electrode thickness, when the discharge current rate (C-rate) is 0.5 C.

Meanwhile, one or more groove depths may be in the range of 1% to 66.7% of the thicknesses of the cathode and the anode when the discharge current rate (C-rate) is less than 0.5 C.

In detail, referring to table 1 and FIG. 7A, when the discharge current rate (C-rate) is less than 0.5 C, the sample 4 (L4) having the groove depth of 66.7% of the thicknesses of the cathode and the anode, the sample 5 (L5) having the groove depth of 33.3% of the thicknesses of the cathode and the anode, and the sample 1 (L1) having the groove depth of 100% of the thicknesses of the cathode and the anode have electrode capacities (mAh/g) similar to each other.

In other words, even if the groove depth is increased, the electrode capacity (mAh/cm$^2$) per unit mass is not increased. When the groove depth is more increased, the mass loss of the electrode is caused. Accordingly, it is preferred that the groove depth is in the range of 1% to 66.7% of the thicknesses of the cathode and the anode.

Meanwhile, one or more groove depths may be in the range of 66.7% to 100% of the thicknesses of the cathode and the anode when the discharge current rate (C-rate) is greater than 0.5 C.

In detail, referring to table 1 and FIG. 7B, when the discharge current rate (C-rate) is greater than 0.5 C, the sample 1 (L1) having 100% of the thicknesses of the cathode and the anode may represent the higher electrode capacity (mAh/cm2) per unit area than those of the sample 4 (L4) having the groove depth of 66.7% of the thicknesses of the cathode and the anode and the sample 5 (L5) having the groove depth of 33.3% of the thicknesses of the cathode and the anode.

Meanwhile, referring to table 1 and FIG. 7A, when the discharge current rate (C-rate) is 0.5 C, and when samples L1, L2, and L3 having the same groove depths are compared with each other, the groove distance of 200 µm between grooves represents the highest electrode capacity (mAh/ cm$^2$) per unit mass. Even if the distances between the grooves are more decreased, the electrode capacity (mAh/cm$^2$) per unit mass is not increased. In other words, as the distance between grooves is more decreased, the mass loss of the electrode is more caused. Even if the distance between grooves is more decreased, the electrode capacity (mAh/cm$^2$) per unit mass is not increased. Accordingly, when the discharge current rate (C-rate) is 0.5 C, the optimal distance between grooves may be 200 μm.

Meanwhile, when the discharge current rate (C-rate) is less than 0.5 C, the distance between a plurality of grooves may be in the range of 200 μm to 1000 μm.

In detail, referring to table 1 and FIG. 7B, the sample L1 (having the groove distance of 200 μm), the sample 2 (L2) (having the groove distance of 400 μm), and the sample L3 (having the groove distance of 600 μm) have the same groove depth and are increased in groove distance.

In addition, when the discharge current rate (C-rate) is less than 0.5 C, the electrode capacity (mAh/cm$^2$) per unit area is more increased from the sample 1 (L1) toward the sample 3 (L3). Accordingly, when the discharge current rate (C-rate) is less than 0.5 C, it may be preferred that the distance between grooves is in the range of 200 μm to 1000 μm.

Meanwhile, when the discharge current rate (C-rate) is greater than 0.5 C, the distance between a plurality of grooves may be in the range of 10 μm to 200 μm.

In detail, referring to table 1 and FIG. 7B, the sample L1 (having the groove distance of 200 μm), the sample 2 (L2) (having the groove distance of 400 μm), and the sample L3 (having the groove distance of 600 μm) have the same groove depth and are increased in groove distance. In addition, when the discharge current rate (C-rate) is less than 0.5 C, the electrode capacity (mAh/cm$^2$) per unit area is increased from the sample 3 (L3) to the sample 1 (L1). In other words, the tendency to increase the electrode capacity (mAh/cm$^2$) per unit area increased may be shown as the groove distance is decreased. In addition, the electrode capacity (mAh/cm$^2$) of the sample 1 (L1) shows the significant difference from the electrode capacities ((mAh/cm$^2$) of other samples (L2 and L3).

Accordingly, when the discharge current rate (C-rate) is greater than 0.5 C, it may be preferred that the distance between grooves is in the range of 10 μm to 200 μm.

Figure 8:
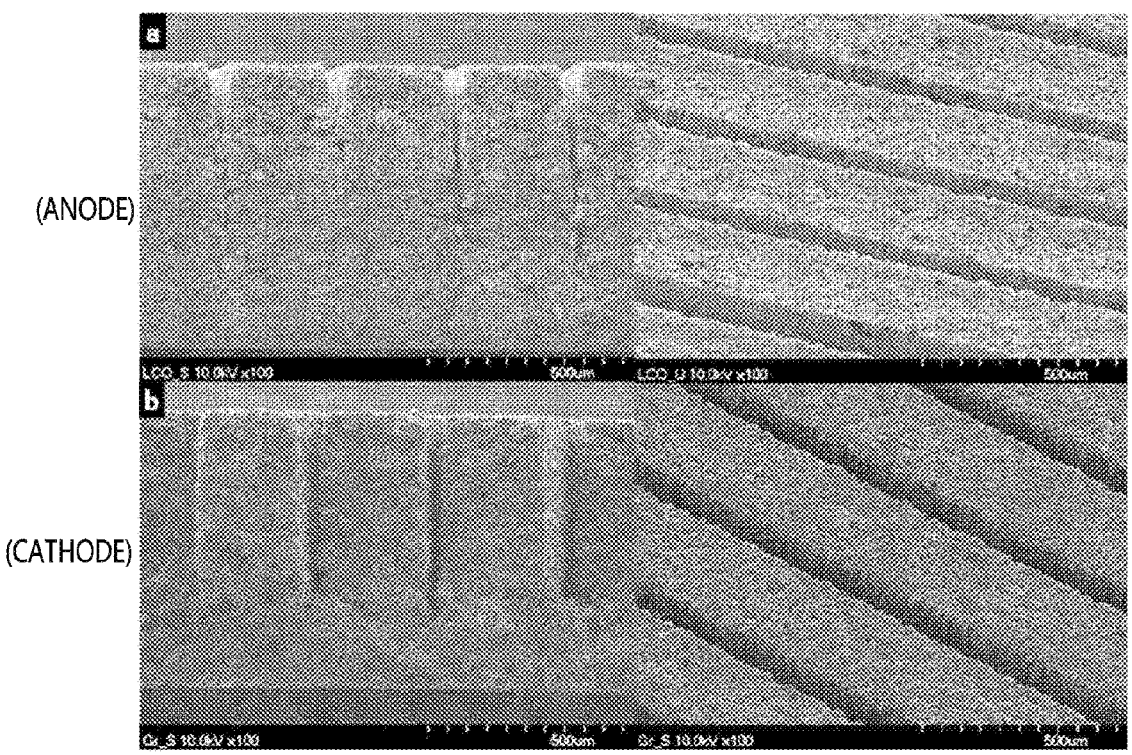
FIGS. 8 to 9 are views illustrating experiment results obtained by utilizing a new sample, according to an embodiment of the present disclosure.
Figure 9:
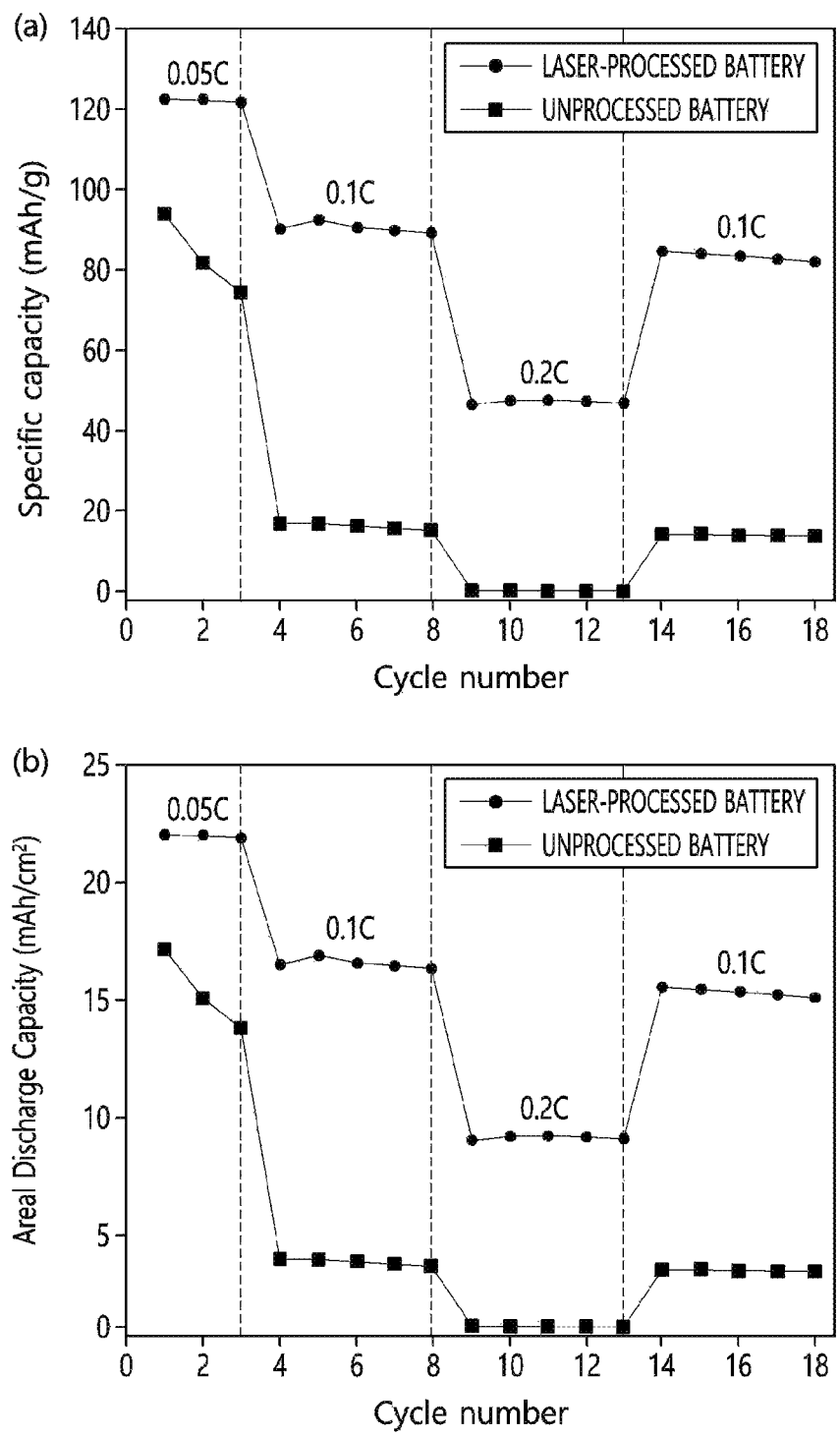

FIGS. 8 to 9 are views illustrating experiment results obtained by utilizing a new sample, according to an embodiment of the present disclosure.

The cathode and the anode of the thick film electrode may have the thicknesses in the range of 500 μm to 1500 μm. FIG. 8 illustrates a sectional view and a front view of new samples showing 500 μm or more in the thicknesses of the cathode and the anode.

The following description will be made regarding information on the cathode of the thick film electrode used in the experiment.

TABLE 6

|  | LCO electrode |
| --- | --- |
| Active material | LCO |
| Composition (active material; binder; conductive material) | 95.6 : 2.2(PVdF) : 2.2(Super P) |
| Thickness | 700 μm |
| Porosity | 55% |

The following description will be made regarding information on the cathode of the thick film electrode used in the experiment.

TABLE 7

|  | Graphite electrode |
| --- | --- |
| Active material | Graphite |
| Composition (active material; binder A; binder B) | 95.6 : 2.2(CMC) : 2.2(SBR) |
| Thickness | 600 μm |
| Porosity | 55% |

In addition, the following description will be made regarding information on a thick film battery including a thick film electrode.

TABLE 8

|  | LCO & graphite cell |
| --- | --- |
| Cathode | LCO cathode |
| anode | Graphite anode |
| Electrolyte | 1M LiPF6 EC/DMC (1:2) |
| separator | PP separator |
| Cell specifications | 2032 coin cell |

In the cathode and the anode of the new sample, the grove depth is 50%, and the distance between grooves is 300 μm.

FIG. 9 illustrates graphs an electrode capacity (mAh/g) per unit mass and an electrode capacity (mAh/cm$^2$) per unit area obtained through the experiment at various discharge current rates (C-rate).

The following description will be made regarding the comparison result of a sample having an unprocessed surface and a sample having a progressed surface in terms of a cell capacity (mAh/g).

TABLE 5

|  | Cell capacity (mAh/g) | | Capacity |
| --- | --- | --- | --- |
|  | Unprocessed battery | Laser-progressed battery | improving rate (%) |
| 0.05 C | 86 | 122 | 42 |
| 0.1 C | 16 | 90 | 462.5 |
| 0.2 C | 0 | 47 | 1000< |

Referring to FIG. 9 and table 5, when the thickness of the thick film electrode is 500 μm, the thick film electrode having the laser-processed surface may show the electrode capacity (mAh/g) per unit mass and the electrode capacity (mAh/cm$^2$) per unit area, which are significantly higher than those of the thick film electrode having the unprocessed surface.

In addition, when the discharge current rate (C-rate) is in the range of 0.05 C to 0.2 C, the progressed thick film electrode is superior to the unprocessed thick film electrode in terms of performance. Accordingly, the thick film electrode may be used for the lithium secondary battery having the discharge current rate (C-rate) in the range of 0.05 C to 0.2 C.

In addition, the progressed thick film electrode shows the higher electrode capacity (mAh/cm$^2$) per unit area, especially, in the range of 0.05 C to 0.1 C. In addition, the thick film electrode according to the present disclosure may be used for a lithium secondary battery for a hearing aid having a discharge current rate (C-rate) of 0.01 C or more and 0.1

C or less, preferably, a lithium secondary battery for a hearing aid having a discharge current rate (C-rate) of 0.05 C or more and 0.1 C or less.

When the thickness of the electrode is increased, an energy density is advantageously increased. To the contrary, the moving path of a lithium ion in the electrode is increased or blocked, so the conductivity of the ion is decreased or the electrical resistance is increased in the electrode.

In addition, such a phenomenon causes the reduction in a charging or discharging capacity of a battery, and causes the battery to have the lower output performance. Accordingly, the thickness of an electrode, which is currently commercialized, is merely in the range of 100 μm to 150 μm.

However, according to the present disclosure, the electrode thickness is increased to 250 μm or more and the electrode surface is structuralized. In addition, as the electrode surface is structuralized, the surficial area of the electrode is widened, and the transfer path of a lithium ion is reduced to lower the electrical resistance. Accordingly, the conductivity of the lithium ion may be improved.

Therefore, according to the present disclosure, an energy density may be improved by increasing the thickness of the electrode and problems such as the reduction of ion conductivity and the increase of the electrical resistance may be solved. In other words, according to the present disclosure, the thick film electrode having the higher-energy density and the higher performance are provided.

In addition, conventionally, an electrode thickness is merely in the range of 100 μm to 150 μm, so a plurality of electrodes are stacked in the form of layers to increase the energy density of the electrodes.

However, according to the present disclosure, an electrode having a thicker thickness may be manufactured in more simplified, and the manufacturing cost is reduced.

Meanwhile, the loss of the mass (capacity) is caused during processing of an electrode. However, according to the present disclosure, the optimal laser processing condition is provided based on the performance of the electrode, which is improved through the processing, and the mass loss of the electrode caused by the processing.

Meanwhile, according to an embodiment of the present disclosure, the lithium secondary battery may include a thick film electrode including a cathode and an anode, a separator, and an electrolyte, and the cathode and the anode are laser-etched with thickness in the range of 250 μm to 1500 μm, so at least one groove is formed in the cathode and the anode.

The above-described disclosure is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data storage device. In addition, the computer may include a control unit of the terminal. Accordingly, the detailed description should be understood by way of example instead of being limitedly interpreted in terms of all aspects. The scope of the present disclosure should be determined by the reasonable interpretation of attached claims, and the equivalents of the present disclosure falls within the scope of the present disclosure.

What is claimed is:

1. A thick film electrode for a lithium secondary battery, the thick film electrode comprising:
   a cathode formed on a current collector and including a cathode active material; and
   an anode formed on a current collector and including an anode active material,
   wherein the cathode and the anode have a thickness in a range of 250 μm to 1500 μm, and are laser-etched to form one or more grooves on a surface,
   wherein the one or more grooves have a form of a line groove, and where the one or more grooves include at least two line grooves, an interval between each nearest edge of the at least two line grooves is the same along the extension direction of the at least two line grooves, and
   wherein a section of the at least two line grooves has a sectional shape that an upper portion of a section of the at least two line grooves has a first slope and a lower portion of a section of the at least two line grooves has a second slope which is bigger than the first slope.

2. The thick film electrode of claim 1, wherein the cathode and the anode have a thickness in a range of 500 μm to 1500 μm.

3. The thick film electrode of claim 1, wherein a limit thickness of the cathode and the anode is greater than a limit thickness of an unprocessed electrode.

4. The thick film electrode of claim 1, wherein an electrode thickness representing a maximum value in an electrode capacity per unit area of the cathode and the anode is greater than an electrode thickness representing a maximum value in an electrode capacity per unit area of an unprocessed electrode.

5. The thick film electrode of claim 1, wherein a depth of the one or more line grooves is in a range of 1% to 100% of the thickness of the cathode and the anode.

6. The thick film electrode of claim 5, wherein the depth of the one or more line grooves is 100% of the thickness of the cathode and the anode.

7. The thick film electrode of claim 1, wherein the cathode and the anode are laser-etched to form a plurality of line grooves having a constant interval on the surface, and
   wherein the constant interval is in a range of 10 μm to 1000 μm.

8. The thick film electrode of claim 7, wherein the constant interval is in a range of 10 μm to 200 μm.

9. The thick film electrode of claim 5, wherein the depth of the one or more line grooves is in a range of 1% to 66.7% of the thickness of the cathode and the anode, when a discharge current rate (C-rate) is less than 0.5C, and
   wherein the depth of the one or more line grooves is in a range of 66.7% to 100% of the thickness of the cathode and the anode, when the discharge current rate (C-rate) is greater than 0.5C.

10. The thick film electrode of claim 7, wherein the constant interval is in a range of 200 μm to 1000 μm, when a discharge current rate (C-rate) is less than 0.5C, and
    wherein the constant interval is in a range of 10 μm to 200 μm, when the discharge current rate (C-rate) is greater than 0.5C.

11. The thick film electrode of claim 1, wherein the thick film electrode is used for a lithium secondary battery having a discharge current rate (C-rate) of 0.1C or more and 1.0C or less.

12. The thick film electrode of claim 1, wherein the thick film electrode is used for a lithium secondary battery having a discharge current rate (C-rate) of 0.05C or more and 0.2C or less.

13. The thick film electrode of claim 11, wherein the thick film electrode is used for a lithium secondary battery for a hearing aid having a discharge current rate (C-rate) of 0.01C or more and 0.1C or less.

14. The thick film electrode of claim 1, wherein the thick film electrode is formed in a single layer form on a conductive current collector.

15. The thick film electrode of claim 1, wherein a limit thickness of the thick film electrode is a product of a square of a surficial area ratio of the thick film electrode and a limit thickness of an unprocessed electrode.

16. The thick film electrode of claim 1, wherein the one or more line grooves have a form of a straight line, or a grid.

17. A lithium secondary battery comprising:
- a thick film electrode including a cathode including a cathode active material and an anode including an anode active material;
- a current collector to form the thick film electrode;
- a separator; and
- an electrolyte,
- wherein the cathode and the anode have a thickness in a range of 250 µm to 1500 µm, and are laser-etched to form one or more line grooves on a surface,
- wherein the one or more grooves have a form of a line groove, and where the one or more grooves include at least two line grooves, an interval between each nearest edge of the at least two line grooves is the same along the extension direction of the at least two line grooves, and
- wherein a section of the at least two line grooves has a sectional shape that an upper portion of a section of the at least two line grooves has a first slope and a lower portion of a section of the at least two line grooves has a second slope which is bigger than the first slope.

18. The lithium secondary battery of claim 17, wherein the cathode and the anode have a thickness in a range of 500 µm to 1500 µm.

19. The lithium secondary battery of claim 17, wherein a limit thickness of the cathode and the anode is greater than a limit thickness of an unprocessed electrode.

20. The lithium secondary battery of claim 17, wherein an electrode thickness representing a maximum value in an electrode capacity per unit area of the cathode and the anode is greater than an electrode thickness representing a maximum value in an electrode capacity per unit area of an unprocessed electrode.

* * * * *